United States Patent
Okamoto et al.

(10) Patent No.: US 8,550,493 B2
(45) Date of Patent: Oct. 8, 2013

(54) AIRBAG DEVICE

(75) Inventors: Yutaka Okamoto, Wako (JP); Fumiharu Ochiai, Wako (JP); Yuji Kikuchi, Wako (JP); Koji Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/498,788

(22) PCT Filed: Sep. 7, 2010

(86) PCT No.: PCT/JP2010/065321
§ 371 (c)(1),
(2), (4) Date: Jun. 8, 2012

(87) PCT Pub. No.: WO2011/040191
PCT Pub. Date: Apr. 7, 2011

(65) Prior Publication Data
US 2012/0241240 A1    Sep. 27, 2012

(30) Foreign Application Priority Data

Sep. 29, 2009 (JP) .................. 2009-224380
Sep. 29, 2009 (JP) .................. 2009-224381

(51) Int. Cl.
*B60R 21/231* (2011.01)
*B60R 21/36* (2011.01)

(52) U.S. Cl.
USPC ...................... 280/730.1; 180/274

(58) Field of Classification Search
USPC ............. 180/274; 280/728.1, 728.2, 730.1
See application file for complete search history.

(56) References Cited

U.S. PATENT DOCUMENTS 7,172,048 B2 *  2/2007  Hamada et al. ............. 180/274
(Continued)

FOREIGN PATENT DOCUMENTS

GB        2397559      7/2004
JP     2002-283939    10/2002
(Continued)

*Primary Examiner* — Joseph Rocca
*Assistant Examiner* — Timothy Wilhelm
(74) *Attorney, Agent, or Firm* — Rankin, Hill & Clark LLP

(57) ABSTRACT

An airbag (18) made of metal is disposed between an edge portion (12a) of a windshield (12) of a vehicle and an outer panel (16), projecting toward an outside of a vehicle body beyond the edge portion (12a), of a front pillar (15). Thus, it is possible to install the airbag device without making large design changes to the existing structure of the vehicle body, and to prevent the external appearance from being deteriorated by the installation of the airbag device. Further, once the airbag (18) made of metal is deployed, the airbag does not shrink. Thus, it is possible not only to reduce the weight and costs by employing an inflator (19) with a smaller volume, but also to cause the airbag to exert a stable shock absorbing capability irrespective of the difference in the timing of the collision of a pedestrian. Further, a part of the airbag (18) is a garnish part (18a) forming an outer surface of the vehicle body in cooperation with the outer panel (16). Thus, it is possible to reduce the number of parts and costs by making the garnish part (18a) exert the garnish function.

10 Claims, 9 Drawing Sheets

(56) References Cited

U.S. PATENT DOCUMENTS

| | | | |
|---|---|---|---|
| 7,174,986 B2 * | 2/2007 | Takimoto | 180/274 |
| 7,341,274 B2 * | 3/2008 | Mori et al. | 280/728.2 |
| 7,988,183 B1 * | 8/2011 | Okamoto et al. | 280/728.2 |
| 8,186,472 B2 * | 5/2012 | Okamoto et al. | 180/274 |
| 8,365,857 B2 * | 2/2013 | Okamoto et al. | 180/274 |
| 2010/0148476 A1 * | 6/2010 | Inoue et al. | 280/728.2 |
| 2011/0278087 A1 * | 11/2011 | Okamoto | 180/274 |

FOREIGN PATENT DOCUMENTS

| | | |
|---|---|---|
| JP | 2006-282105 | 10/2006 |
| JP | 2007-137252 | 6/2007 |
| JP | 2009-143552 | 7/2009 |
| JP | 2009-154679 | 7/2009 |

* cited by examiner

AIRBAG DEVICE

TECHNICAL FIELD

The present invention relates to an airbag device in which an airbag made of metal is disposed between an edge portion of a windshield of a vehicle and an outer panel projecting toward an outside of a vehicle body beyond the edge portion, and which protects a pedestrian by deploying the airbag into the shape of a tube along the edge portion of the windshield by use of gas produced by an inflator.

BACKGROUND ART

Patent Document 1 below has made publicly known an airbag system for protecting a pedestrian which is configured so that: a folded airbag made of cloth is stored inside a pillar garnish for covering a front surface of a front pillar of an automobile; in collision with a pedestrian, gas produced by an inflator is supplied to the airbag, and thus deploys the airbag along the front surface of the front pillar from a rip which is made when the pillar garnish breaks; and the pedestrian is protected with the airbag thus deployed.

In addition, Patent Document 2 below has made publicly known a shock absorbing structure for protecting a pedestrian which is configured so that: a pillar garnish for covering a front surface of a front pillar of an automobile is supported by a pillar skeletal member with a link-type pillar driving mechanism being interposed in between; in collision with a pedestrian, the pillar driving mechanism lifts the pillar garnish up from the pillar skeletal member so as to allow the pillar garnish to make stroke motions; and the pillar garnish thus absorbs the collision energy.

Patent Document 1: Japanese Patent Application Laid-open No. 2002-283939
Patent Document 2: Japanese Patent Application Laid-open No. 2006-282105

DISCLOSURE OF INVENTION

Problems to be Solved by the Invention

In the case of the invention disclosed in Patent Document 1 above, however, it is difficult to keep the airbag deployed for a long time because the airbag is made of cloth; therefore, the airbag may not fully exhibit its shock absorbing effects depending on timing at which the pedestrian collides with the front pillar.

In the meantime, the invention disclosed in Patent Document 2 above has a problem that: the structure of the link-type pillar driving mechanism for movably supporting the pillar garnish with the pillar skeletal member is complicated; thus, the number of parts increases, and the cost increases.

The present invention has been made with the foregoing situations taken into consideration. An object of the present invention is to provide an airbag device capable of securely protecting a pedestrian by use of a simple structure.

Means for Solving the Problems

In order to attain the above object, according to a first aspect of the present invention, there is provided an airbag device in which an airbag made of metal is disposed between an edge portion of a windshield of a vehicle and an outer panel projecting toward an outside of a vehicle body beyond the edge portion, and which protects a pedestrian by deploying the airbag into the shape of a tube along the edge portion of the windshield by use of gas produced by an inflator, wherein the airbag includes: a garnish part forming an outer surface of the vehicle body in cooperation with the outer panel; a folded part provided continuous to the garnish part, and folded; and closing parts for closing, respectively, opposite end portions of each of the garnish part and the folded part in a longitudinal direction.

Furthermore, according to a second aspect of the present invention, in addition to the first aspect, there is provided the airbag device wherein the garnish part includes an outer panel-side lip for sealing an interstice between the garnish part and the outer panel, and the folded part includes a windshield-side lip for sealing an interstice between the folded part and the windshield.

Moreover, according to a third aspect of the present invention, in addition to the first or second aspect, there is provided the airbag device wherein the folded part includes a windshield-side folded part situated closer to the windshield, and an outer panel-side folded part situated closer to the outer panel, and an amount of expansion of the outer panel-side folded part is set larger than an amount of expansion of the windshield-side folded part.

Furthermore, according to a fourth aspect of the present invention, in addition to any one of the first to third aspects, there is provided the airbag device wherein the folded part is folded in the shape of an accordion, and a fold density of its portion closer to an inside of the vehicle body is lower than a fold density of its portion closer to the outside of the vehicle body.

Moreover, according to a fifth aspect of the present invention, in addition to any one of the first to fourth aspects, there is provided the airbag device comprising a vent hole formed in a portion of the folded part that is adjacent to at least one of the two closing parts.

Furthermore, according to a sixth aspect of the present invention, in addition to the fifth aspect, there is provided the airbag device wherein the folded part is folded in the shape of an accordion, and the vent hole is formed in flat parts of the folded part.

Moreover, according to a seventh aspect of the present invention, in addition to the sixth aspect, there is provided the airbag device wherein the vent holes, respectively, in two flat parts, which are opposed to each other in a folded state, of the folded part are formed to be alternately displaced.

Furthermore, according to an eighth aspect of the present invention, in addition to the fifth aspect, there is provided the airbag device wherein the folded part is folded in the shape of an accordion, and the vent hole is formed in a radial inner bent portion of the folded part.

Moreover, according to a ninth aspect of the present invention, in addition to the fifth aspect, there is provided the airbag device wherein the folded part is folded into the shape of a roll, and the vent hole is formed in a wind starting portion of the roll.

Furthermore, according to a tenth aspect of the present invention, in addition to any one of the fifth to ninth aspects, there is provided the airbag device wherein the airbag includes a plurality of vent holes, and a total of areas of openings of the plurality of vent holes is 700 mm$^2$ with a margin of plus and minus 100 mm$^2$.

Here, a front windshield 12 of embodiments corresponds to the windshield of the present invention; a windshield-side folded part 18b of the embodiments corresponds to the folded part of the present invention; an outer panel-side folded part 18c of the embodiments corresponds to the folded part of the present invention; and an end cap 24 of the embodiments corresponds to the closing part of the present invention.

Effects of the Invention

The first aspect of the present invention makes it possible to install the airbag device without making large design changes to the existing structure of the vehicle body, and to prevent the external appearance from being deteriorated by the installation of the airbag device, because the airbag made of metal is disposed between the edge portion of the windshield of the vehicle and the outer panel projecting toward the outside of the vehicle body beyond the edge portion. In addition, the first aspect makes it possible not only to reduce the weight and costs by employing an inflator with a smaller volume, but also to cause the airbag to exert a stable shock absorbing capability irrespective of the difference in the timing of the collision of a pedestrian, because once the airbag made of metal is deployed, the airbag does not shrink and thus absorbs the shock of the pedestrian with its metallic plastic deformation. Furthermore, the first aspect makes a case or cover for storing the folded airbag no longer necessary, as well as makes it possible to reduce the number of parts and costs by making the garnish part exert the garnish function, and to enhance the shock absorbing capability by increasing the volume of the airbag after the deployment by use of the folded part, because the airbag includes: the garnish part forming the outer surface of the vehicle body in cooperation with the outer panel; the folded part provided continuous to the garnish part, and folded; and the closing parts for closing, respectively, the opposite end portions of each of the garnish part and the folded part in the longitudinal direction.

In addition, the second aspect of the present invention makes it possible to enhance the sealing quality while preventing the airbag made of metal from coming into direct contact with the outer panel and the windshield, because the garnish part is provided with the outer panel-side lip for sealing the interstice between the garnish part and the outer panel, and the folded part is provided with the windshield-side lip for sealing the interstice between the folded part and the windshield.

Furthermore, the third aspect of the present invention makes it possible to securely cover the outer panel, which is harder than the windshield, with the airbag by expanding the outer panel-side folded part to a large extent during the deployment of the airbag, and to cause the airbag to effectively exert the shock absorbing capability, because: the folded parts include the windshield-side folded part situated closer to the windshield, and the outer panel-side folded part situated closer to the outer panel; and the amount of expansion of the outer panel-side folded part is set larger than the amount of expansion of the windshield-side folded part.

Moreover, with the fourth aspect of the present invention, in the folded part folded in the shape of an accordion, the fold density of the portion closer to the inside of the vehicle body is lower than the fold density of the portion closer to the outside of the vehicle body. Accordingly, during the initial phase of the deployment, the portion with the lower fold density which is closer to the inside of the vehicle body is first deployed, and then the portion with the higher fold density which is closer to the outside of the vehicle body is pushed out. Thereby, it enables the outer surface of the outer panel to be securely covered with the portion closer to the outside of the vehicle body which is deployed with the delay.

Additionally, the fifth aspect of the present invention makes it possible to quickly deploy the airbag by making the gas hard to escape through the vent hole in the initial phase of the deployment of the airbag in which the folded part is not expanded, and to prevent the internal pressure of the airbag from excessively rising by making the gas easy to escape through the vent hole in the terminal phase of the deployment of the airbag in which the folded part is expanded, because the vent hole is formed in a portion of the folded part which is adjacent to at least one of the two closing parts.

Further, the sixth aspect of the present invention makes it hard for the gas to escape by closing the vent hole with the flat part in the initial phase of the deployment of the airbag in which the folded parts are not expanded, because the vent hole is formed in the flat parts of the folded part which is folded in the shape of an accordion.

Further, with the seventh aspect of the present invention, the vent holes, respectively, in two flat parts, which are opposed to each other in the folded state, of the folded part are formed to be alternately displaced. Accordingly, it is possible to prevent the vent holes, respectively, in two flat parts from not being closed due to their overlap.

In addition, with the eighth aspect of the present invention, the vent hole is formed in the radial inner bent portion of the folded part which is folded in the shape of an accordion. This makes it easy for the airbag to expand by decreasing the rigidity of the radial inner bent portion, and makes it possible to subject the airbag to press-forming with a lighter load when folding the airbag.

Furthermore, the ninth aspect of the present invention makes it hard for the gas to escape by preventing the vent hole from being set open at the initial phase of the deployment of the airbag in which the folded part is not expanded, because the vent hole is formed in the roll wind starting portion of the folded part which is folded into the shape of a roll.

Moreover, the tenth aspect of the present invention makes it possible to adjust the internal pressure of the airbag by allowing the gas to escape through the vent holes at an appropriate timing, because the total of the areas of the openings of the multiple vent holes of the airbag is set at 700mm$^2$ with a margin of plus and minus 100 mm$^2$.

EXPLANATION OF REFERENCE NUMERALS AND SYMBOLS

12 Front windshield (windshield)
12*a* Edge portion
18 Outer panel
18*a* Airbag
18*a* Garnish part
18*b* Windshield-side folded part (folded part)

18c Outer panel-side folded part (folded part)
18f Vent hole
18g Flat part
19 Inflator
24 End cap (closing part)
32 Outer panel-side lip
33 Windshield-side lip

BEST MODES FOR CARRYING OUT THE INVENTION

Modes for carrying out the present invention are explained below based on embodiments of the present invention shown in the attached drawings.

Embodiment 1

A first embodiment of the present invention will be described below based on FIGS. 1 to 7.

Figure 1:
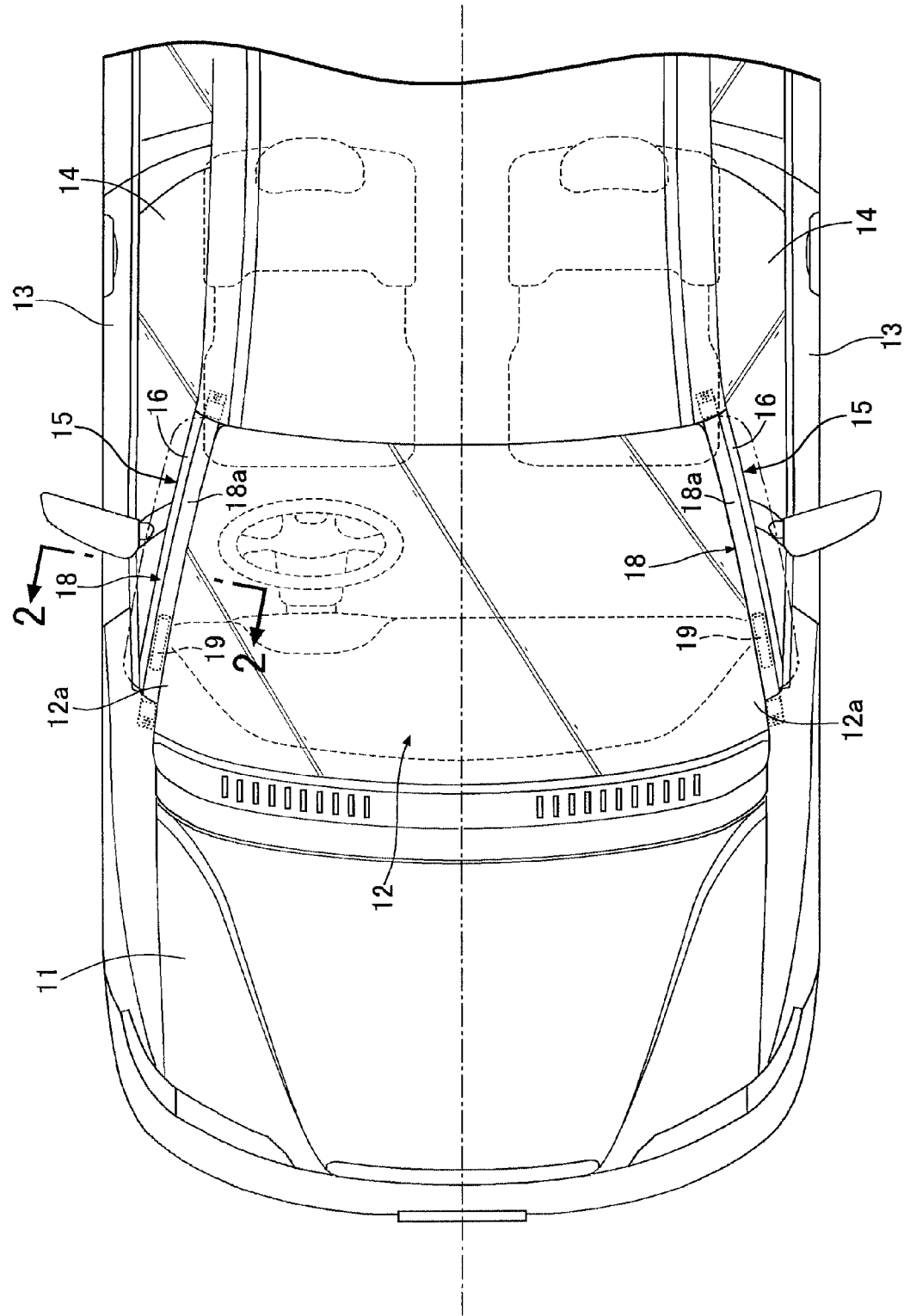
FIG. 1 is a plan view of a front part of a vehicle body of an automobile. (first embodiment)

As shown in FIG. 1, an automobile has a front windshield 12 in the rear of a hood 11, and front pillars 15, 15 are arranged in a way that the front pillars 15, 15 are interposed between left and right edge portions 12a, 12a of the front windshield 12 and door glasses 14, 14 of front doors 13, 13, respectively.

Figure 2:
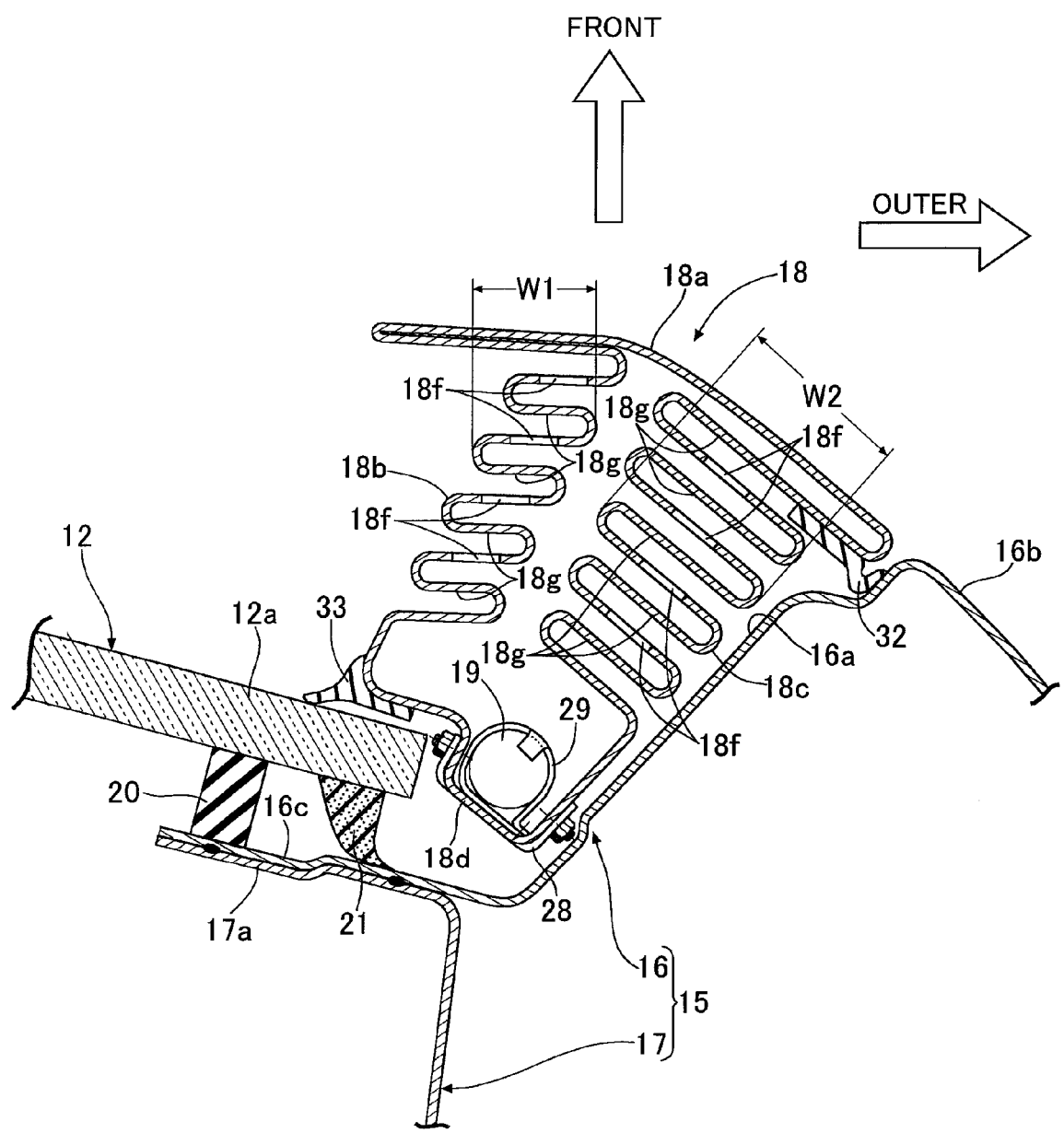
FIG. 2 is an enlarged sectional view taken along a line 2-2 in FIG. 1. (first embodiment)

As shown in FIG. 2, the front pillar 15 is formed in a closed cross section by bonding together an outer panel 16 situated in an outer side of a vehicle body and an inner panel 17 situated in an inner side of the vehicle body. An airbag 18 made of metal, which also serves as a pillar garnish, is folded and arranged in front of a front surface 16a of the outer panel 16. The corresponding edge portion 12a of the front windshield 12 is adhered to front faces of joint sections 16c, 17a of the outer panel 16 and the inner panel 17, respectively, with an adhesive 21 with a dam rubber 20 being interposed in between.

The airbag 18 obtained by folding a metal tube includes a garnish part 18a, a windshield-side folded part 18b, an outer panel-side folded part 18c and an inflator supporting part 18d. The garnish part 18a smoothly extends from a side surface 16b of the outer panel 16 of the front pillar 15 toward the front windshield 12, and functions as a pillar garnish arranged between the outer panel 16 and the front windshield 12.

The windshield-side folded part 18b and the outer panel-side folded part 18c are each folded in an accordion shape behind (in the rear of) the garnish part 18a for the purpose of securing the expansion margin of the airbag 18 when it is deployed. At this point, a folded width W2 of the outer panel-side folded part 18c is set larger than a folded width W1 of the windshield-side folded part 18b.

Figure 3:
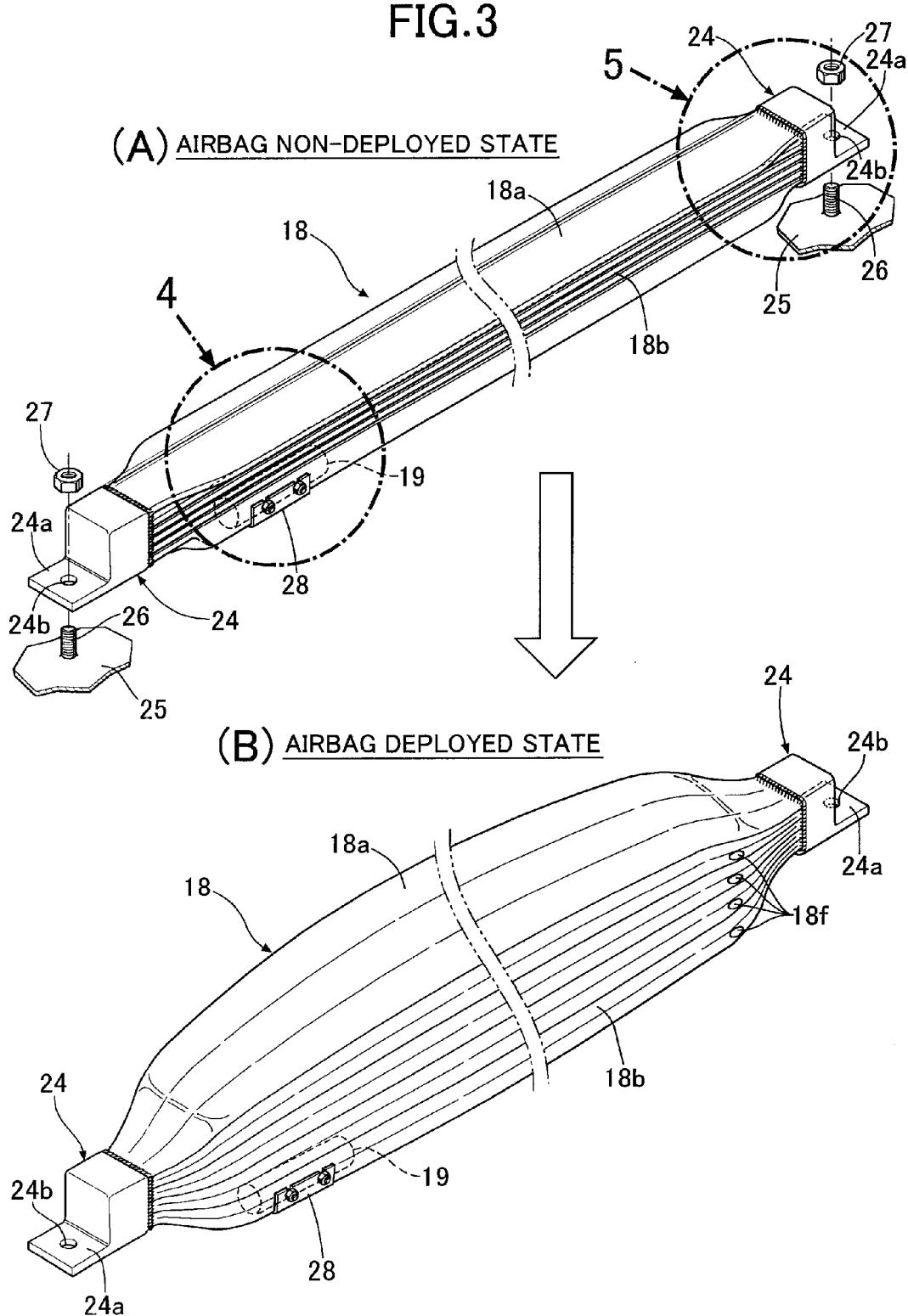
FIG. 3 is perspective views of an airbag. (first embodiment)
Figure 5:
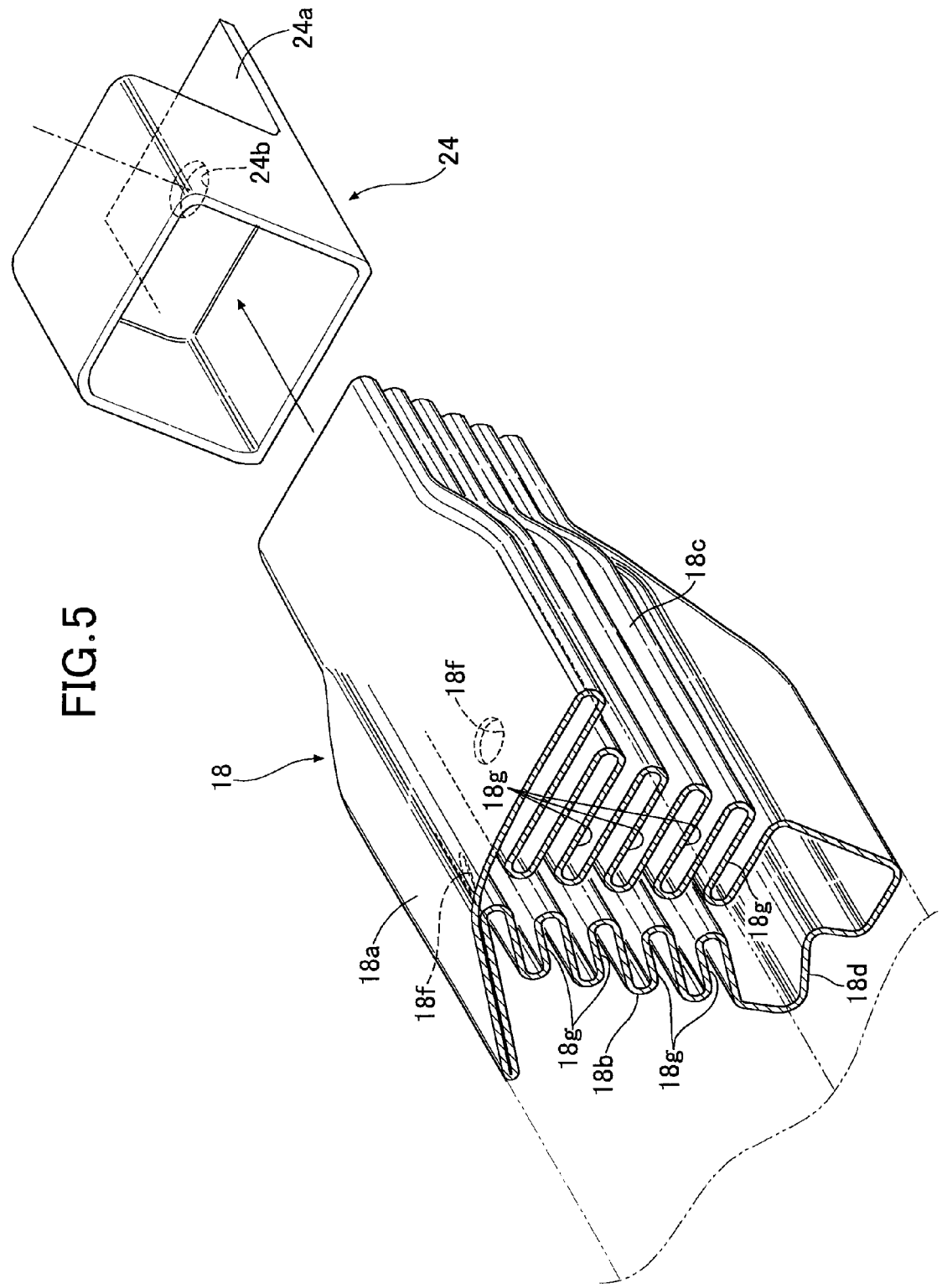
FIG. 5 is an enlarged perspective view of a part indicated by an arrow 5 in FIG. 3. (first embodiment)
Figure 6:
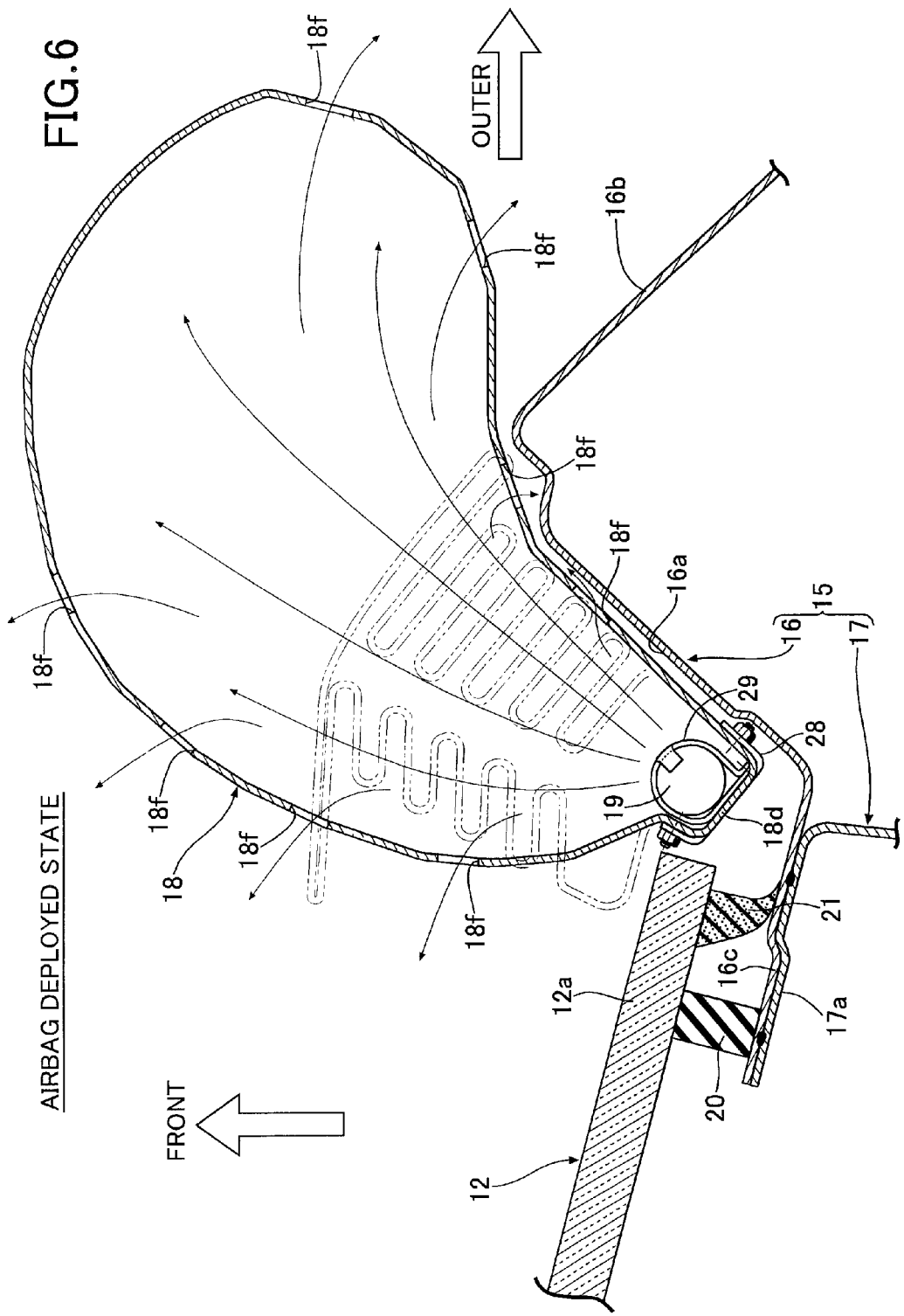
FIG. 6 is a view corresponding to FIG. 2 and explaining an operation when the airbag deploys. (first embodiment)

As clearly observed in FIGS. 3 and 5, opposite end portions of the airbag 18 in a folded state are formed to be thinner by pressing, and end caps 24, 24 are fitted and welded to the respective opposite end portions. Thereby, the opposite end portions of the airbag 18 are sealed hermetically. Each end cap 24 includes an attachment portion 24a. By screwing a nut 27 onto a bolt 26 which runs through a vehicle body panel 25 and a bolt hole 24b of the attachment portion 24a, the airbag 18 is fixed along the front pillar 15.

An inflator 19 configured to produce gas for deploying the airbag 18 is attached in a lower end portion of the inflator supporting part 18d which faces the garnish part 18a with the windshield-side folded part 18b and the outer panel-side folded part 18c interposed therebetween.

Figure 4:
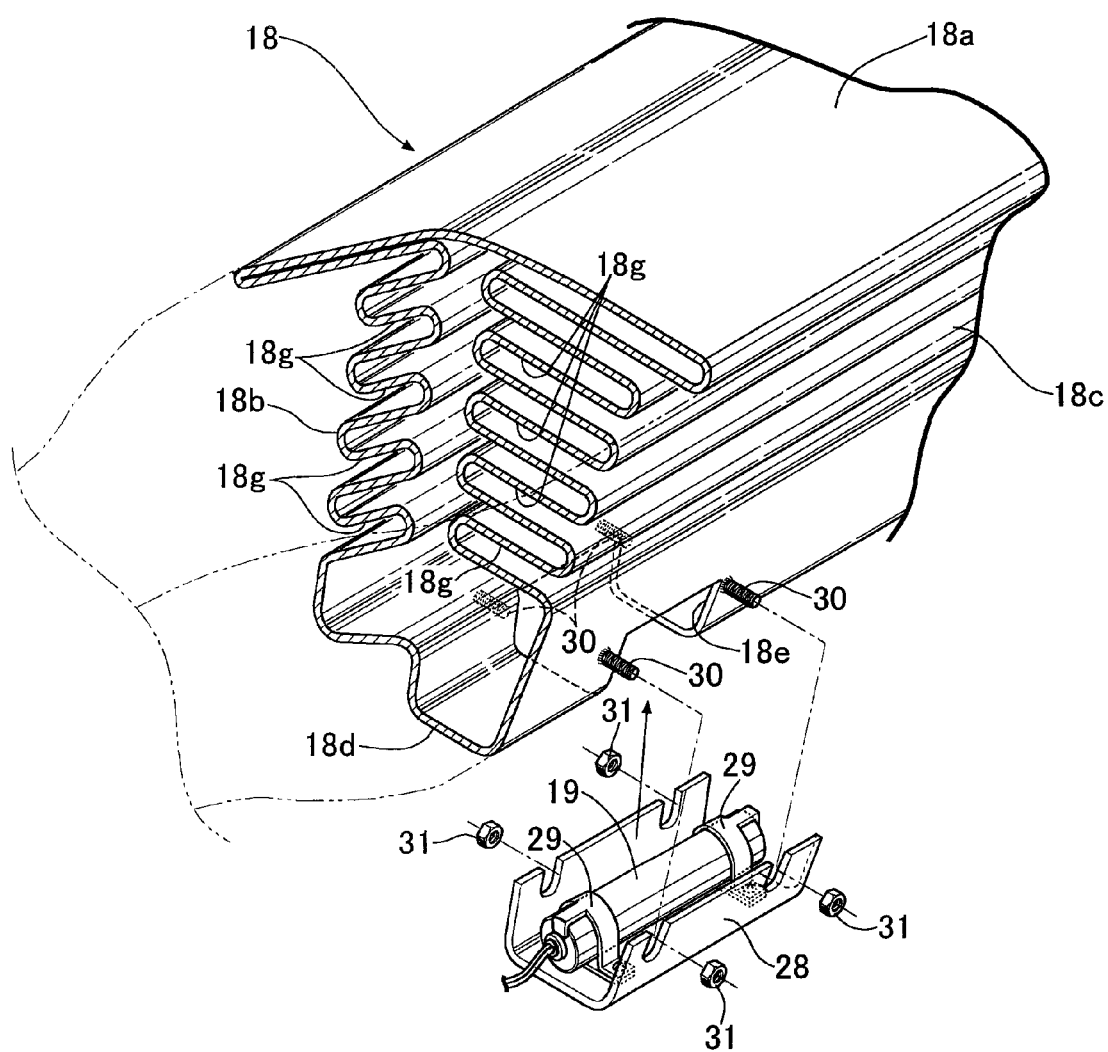
FIG. 4 is an enlarged and exploded perspective view of a part indicated by an arrow 4 in FIG. 3. (first embodiment)

As clearly shown in FIGS. 2 to 4, the inflator 19 having a cylindrical shape is fixed to an inner surface of an attachment bracket 28 having an U-shape cross section with two fastening devices 29, 29. This attachment bracket 28 is overlaid an opening 18e formed in the inflator supporting part 18d of the airbag 18 from outside and fixed to the inflator supporting part 18d with bolts 30 . . . and nuts 31 . . . .

As is clear from FIG. 2, an outer panel-side lip 32 is arranged in a boundary between the garnish part 18a and the outer panel-side folded part 18c of the airbag 18. This outer panel-side lip 32 is configured to be in contact with the front surface 16a of the outer panel 16. A windshield-side lip 33 is installed in a boundary between the windshield-side folded part 18b and the inflator supporting part 18d of the airbag 18. This windshield-side lip 33 is configured to be in contact with a front surface of the edge portion 12a of the front windshield 12. The outer panel-side lip 32 and the windshield-side lip 33 block rainwater and the like from entering the inflator supporting part 18d side of the airbag 18; therefore, the inflator 19 can be protected.

As clearly indicated in FIGS. 2 and 3(B), multiple vent holes 18f . . . are formed in a vicinity of an end portion (for instance, an upper end portion) of the airbag 18. The vent holes 18f . . . are formed in flat parts 18g . . . located in the accordion-folded part of the windshield-side folded part 18b and the outer panel-side folded part 18c. At the same time, the vent holes 18f are arranged in a way that no vent holes 18f, 18f are formed in the corresponding locations of two opposing flat parts 18g, 18g, in other words, in a way that each two neighboring vent holes 18f, 18f do not overlap each other.

Next, descriptions will be provided for an operation of the embodiment of the present invention including the foregoing configuration.

In a normal time when the airbag 18 is not deployed, the garnish part 18a of the airbag 18 smoothly extends toward the side surface 16b of the outer panel 16 of the front pillar 15, and exhibits a pillar garnish function. Accordingly, this makes it possible to abolish a specialized pillar garnish, and thus to reduce parts in number. Furthermore, by replacing the conventional pillar garnish, the airbag 18 can be compactly installed between the front pillar 15 and the front windshield 12. Therefore, neither case nor cover is required for storing the folded airbag 18, while a good external appearance around the front pillar 15 is maintained.

Once it is detected that the vehicle has collided with a pedestrian, the inflator 19 is actuated, and an internal pressure of the airbag 18 increases due to the gas produced by the inflator 19. Then, due to this increase in the internal pressure, the windshield-side folded part 18b and the outer panel-side folded part 18c of the airbag 18 which are folded in an accordion shape are first inflated toward the outside of the vehicle body, then deployed in the left and right directions in a way that the front surface 16a and the side surface 16b of the outer panel 16 of the front pillar 15 are covered.

In this event, the airbag 18 as deployed can secure a larger peripheral length, and can enhance its shock absorbing capability by covering a wider area of the front pillar 15, because the airbag 18 includes the windshield-side folded part 18b and the outer panel-side folded part 18c. In addition, although the front pillar 15 gives a larger shock to a pedestrian than the front windshield 12 because the front pillar 15 is harder than the front windshield 12, the airbag 18 can further enhance its shock absorbing capability by being deploying in a way that makes the airbag 18 wrap the side surface 16b of the outer panel 16 because an expansion margin (an amount of expansion) of the outer panel-side folded part 18c at the time of deployment is made larger by setting the folded width W2 of the outer panel-side folded part 18c larger than the folded width W1 of the windshield-side folded part 18b.

Airbag devices for a pedestrian have a characteristic that a length of time before the collision of a pedestrian with the front pillar 15 varies relatively largely depending on the physique of the pedestrian and the vehicle speed at the collision. For this reason, conventional airbags made of cloth have a problem that they need an inflator with a large volume which is capable of generating gas continuously for the purpose of keeping their deployed state for a predetermined length of time. In contrast, this embodiment employs the airbag 18 made of metal, and the airbag 18 as once deployed keeps its deployed state even after stopping the supply of the gas. With a smaller volume of the inflator 19, the airbag 18 can exert an effective shock absorbing capability irrespective of timing when a pedestrian collides with the front pillar 15, because its plastic deformation absorbs the shock of the collision of the pedestrian.

Furthermore, the vent holes 18*f*, . . . are formed in the flat parts 18*g*, . . . of the accordion-shaped windshield-side folded part 18*b* and the accordion-shaped outer panel-side folded part 18*c* of the airbag 18, and the locations in which the respective vent holes 18*f*, . . . are formed are situated in the vicinity of an end portion of the airbag 18 in the longitudinal direction. For this reason, the flat parts 18*g*, . . . are almost in intimate contact with each other in the initial phase of the deployment of the airbag 18. Accordingly, the vent holes 18*f*, . . . of the airbag 18 are closed by the flat parts 18*g*, . . . . This makes it possible to prevent the gas from unnecessarily leaking through the vent holes 18*f*, . . . , and to deploy the airbag 18 quickly. Moreover, the flat parts 18*g*, . . . come apart and the vent holes 18*f*, . . . are set open in the terminal phase of the deployment of the airbag 18. This makes it possible to prevent the internal pressure from increasing excessively by discharging an excessive amount of the gas through the vent holes 18*f*, . . . .

Figure 7:
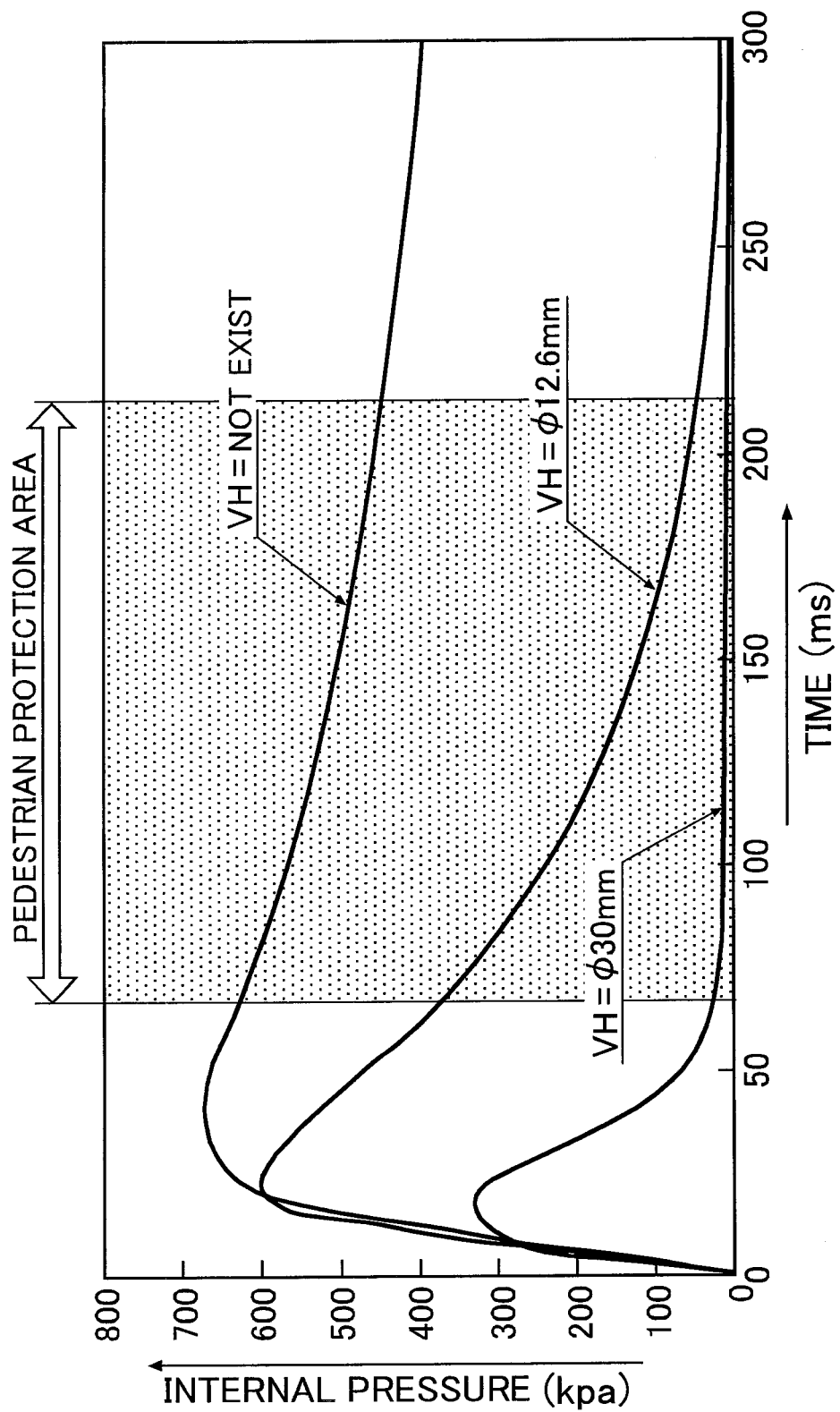
FIG. 7 is a graph showing a relationship between a lapsed time after the onset of the deployment of the airbag and an internal pressure of the airbag. (first embodiment)

FIG. 7 shows a relationship between the lapsed time after the onset of the deployment of the airbag 18 and the internal pressure of the airbag 18. On the assumption that the multiple vent holes 18*f*, . . . are replaced with a single vent hole 18*f* having an opening whose area is equal to a total of the areas of the openings of the multiple vent holes 18*f*, 12.6 mm and 30 mm in FIG. 7 each represent a virtual diameter of such a single vent hole 18*f*.

Once the inflator 19 is activated, the internal pressure of the airbag 18 increases rapidly, and its deployment is completed. In a case where that there exists no vent hole 18*f*, the decrease in the internal pressure progresses slowly after the deployment. The internal pressure is still kept at a high value at timing when the pedestrian collides with the front pillar 15 (in a period of 65ms to 215ms after the onset of the deployment of the airbag 18). Accordingly, there is a possibility that the airbag 18 may not crush smoothly and may not exert its shock absorbing capability fully, in the case where no vent hole 18*f* exists.

In a case where the virtual diameter of the single vent hole 18*f* is 12.6 mm, the decrease in the internal pressure progresses quickly compared with the case where no vent hole 18 exists. However, it is not sufficient yet. In a case where the virtual diameter of the single vent hole 18*f* is 30 mm, the internal pressure of the airbag 18 is kept at nearly zero at the timing when the pedestrian collides with the front pillar 15. The airbag 18 crushes suitably at the collision of the pedestrian, and exerts an effective shock absorbing capability. In addition, the internal pressure of the airbag 18 is kept at zero stably throughout the timing of the collision of the pedestrian. For this reason, the airbag 18 can obtain a stable shock absorbing effect irrespective of the timing of the collision.

The airbag 18 of the present embodiment has the multiple vent holes 18*f*, . . . . The total of the areas of the openings of the multiple vent holes 18*f*, . . . are set equal to the area of the opening of the single vent hole 18*f* with a diameter of 30 mm (or approximately 700 mm$^2$). Because, in this manner, the multiple vent holes 18*f*, . . . with a small diameter are provided to the airbag 18 and are covered by the flat parts 18*g*, . . . of the windshield-side folded part 18*b* and the outer panel-side folded part 18*c*, the airbag 18 can inhibit the gas from leaking through the vent holes 18*f*, . . . , and can deploy quickly. In addition, because the gas produced by the inflator 19 is effectively used for the deployment of the airbag 18, the airbag 18 can contribute to the downsizing of the inflator 19.

Embodiment 2

Figure 8:
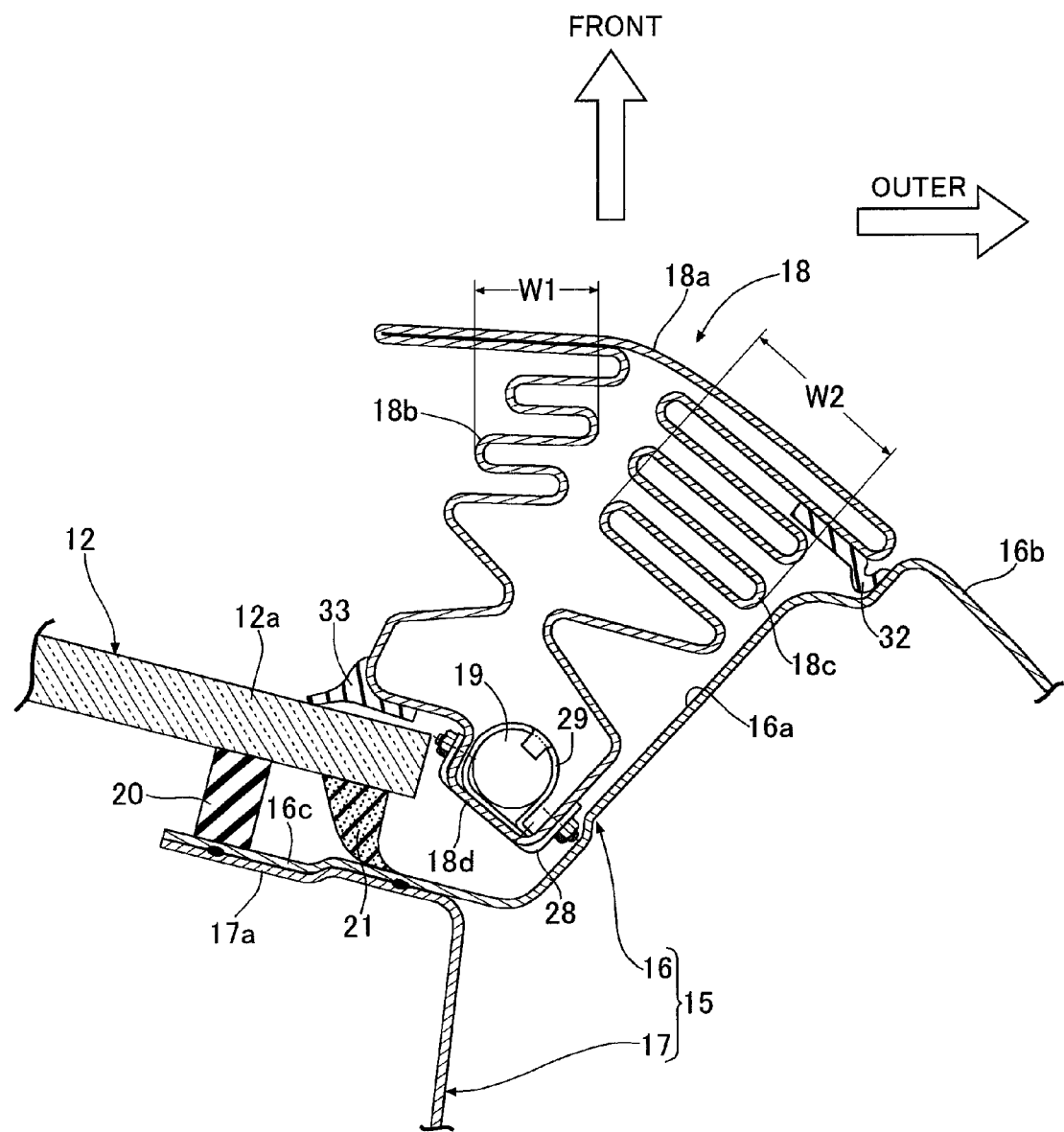
FIG. 8 is an enlarged sectional view taken along a line 2-2 in FIG. 1. (second embodiment)

Next, a second embodiment of the present invention will be described on the basis of FIG. 8.

In the first embodiment, the fold density of the windshield-side folded part 18*b* and the fold density of the outer panel-side folded part 18*c* are set uniformly in the inward-outward direction of the vehicle body. In the second embodiment, the fold density of the windshield-side folded part 18*b* and the fold density of the outer panel-side folded part 18*c* are set lower in portions closer to the inside of the vehicle body, and higher in portions closer to the outside of the vehicle body.

In this second embodiment, in the initial phase of the deployment of the airbag 18, out of the windshield-side folded part 18*b* and the outer panel-side folded part 18*c*, the portions closer to the inside of the vehicle body where the fold density is lower deploys first, and the portions closer to the outside of the vehicle body where the fold density is higher subsequently projects toward the outside of the vehicle body. For this reason, the outer surface of the outer panel 16 can be securely covered by the portion closer to the outside of the vehicle body which subsequently deploys.

[Embodiment 3 to Embodiment 7]

Figure 9:
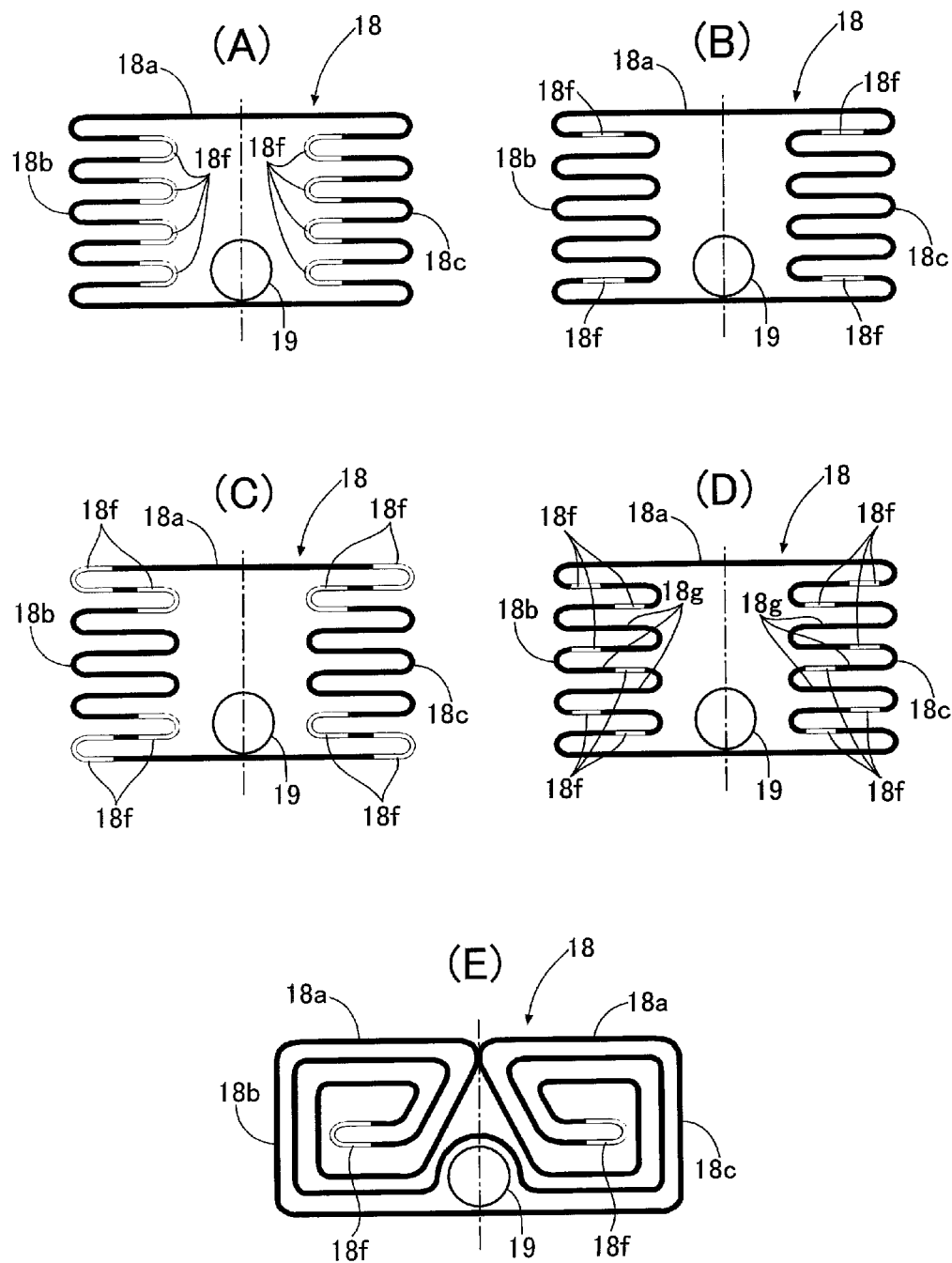
FIG. 9 is views showing other embodiments having other folding ways of the airbag and positions of vent holes. (third to seventh embodiments)

Next, other embodiments of the vent holes 18*f*, . . . will be described on the basis of FIG. 9.

FIG. 9(A) shows a third embodiment of the present invention. The vent holes 18*f*, . . . are formed in inner bent portions of each of the accordion-shaped windshield-side folded part 18*b* and the accordion-shaped outer panel-side folded part 18*c* of the airbag 18. This embodiment brings about the same operation and effect as does the first embodiment, as well as additionally makes it easy for the airbag 18 to deploy, and makes it possible to decrease a press load which is applied to the airbag 18 when folding the airbag 12, because the formation of the vent holes 18*f*, . . . makes it easy for the inner bent portions of each of the windshield-side folded part 18*b* and the outer panel-side folded part 18*c* to bend.

FIG. 9(B) and FIG. 9(C) show fourth and fifth embodiments, respectively. The vent holes 18*f*, . . . are concentratedly formed in portions closer to the outside of the vehicle body and portions closer to the inside of the vehicle body of each of the windshield-side folded part 18*b* and the outer panel-side folded part 18*c* of the airbag 18. These embodiments bring about the same operation and effect as does the first embodiment, and additionally makes it possible to deploy the airbag 18 easily toward the outside of the vehicle body, because the portions closer to the outside of the vehicle body and the portions closer to the inside of the vehicle body of each of the windshield-side folded part 18*b* and the outer panel-side folded part 18*c* are deployed first due to their rigidity which is decreased by the provision of the vent holes 18*f*, . . . .

FIG. 9(D) shows a sixth embodiment. The vent holes 18*f*, . . . are formed to be alternately displaced such that the vent holes 18*f*, 18*f*, respectively, in each opposed flat parts 18*g*, 18*g* in each of the windshield-side folded part 18*b* and the outer panel-side folded part 18*c* of the airbag 18 do not overlap each other. This makes it possible to securely exert the effect of preventing the gas leakage by covering the vent holes 18*f*, . . . with the flat parts 18*g*, . . . in the initial phase of the deployment of the airbag 18, and accordingly to achieve the same operation and effect as does the first embodiment.

FIG. 9(E) shows a seventh embodiment. The airbag 18 is folded into the shape of a roll, unlike the airbags 18 of the second to sixth embodiments which are folded in the shape of an accordion. The vent holes 18f, . . . are formed, respectively, in tip end portions (wind starting portions) of the roll. This embodiment also can achieve the same operation and effect as can the first embodiment, because the vent holes 18f, . . . are kept in a closed state until the terminal phase of the deployment of the airbag 18. Incidentally, in this embodiment, the airbag 18 has two divided garnish parts 18a, 18a, one of which is situated close to the front windshield 12, and the other of which is situated close to the outer panel 16.

Although the foregoing descriptions have been provided for embodiments of the present invention, various design changes may be made to the present invention within the scope not departing from the gist of the present invention.

For example, the way of folding the airbag 18 is not limited to the embodiments, and any folding way may be employed.

In addition, although it is stated that an optimal value of the total of the areas of the openings of the vent holes 18f is approximately 700 mm² in FIG. 7, the sufficient effect can be obtained as long as the total falls within a range of 700 mm² with a margin of plus and minus 100 mm².

The invention claimed is:

1. An airbag device in which an airbag made of metal is disposed between an edge portion of a windshield and a front door of a vehicle, and which protects a pedestrian by deploying the airbag into the shape of a tube along the edge portion of the windshield by use of gas produced by an inflator, wherein
the airbag includes: a garnish part forming an outer surface of a vehicle body in cooperation with an outer panel; a folded part provided continuous to the garnish part, and folded; two closing parts for closing, respectively, opposite end portions of each of the garnish part and the folded part in a longitudinal direction; and a vent hole formed in a portion of the folded part that is adjacent to at least one of the two closing parts,
the folded part is folded in the shape of an accordion,
the vent hole is formed in a radial inner bent portion of the folded part, and
the garnish part includes an outer panel-side lip for sealing an interstice between the garnish part and the outer panel, and
the folded part includes a windshield-side lip for sealing an interstice between the folded part and the windshield.

2. The airbag device according to claim 1, wherein
the airbag includes a plurality of vent holes, and
a total of areas of openings of the plurality of vent holes is 700mm² with a margin of plus and minus 100mm².

3. The airbag device according to claim 1, wherein
the airbag made of metal is disposed between the edge portion and the outer panel projecting toward an outside of the vehicle body beyond the edge portion.

4. An airbag device in which an airbag made of metal is disposed between an edge portion of a windshield and a front door of a vehicle, and which protects a pedestrian by deploying the airbag into the shape of a tube along the edge portion of the windshield by use of gas produced by an inflator, wherein
the airbag includes: a garnish part forming an outer surface of a vehicle body in cooperation with an outer panel; a folded part provided continuous to the garnish part, and folded; two closing parts for closing, respectively, opposite end portions of each of the garnish part and the folded part in a longitudinal direction; and a vent hole formed in a portion of the folded part that is adjacent to at least one of the two closing parts, wherein
the folded part is folded in the shape of an accordion,
the vent hole is formed in a radial inner bent portion of the folded part, and
a fold density of a portion closer to an inside of the vehicle body is lower than a fold density of a portion closer to an outside of the vehicle body.

5. The airbag device according to claim 4, wherein
the folded part includes a windshield-side folded part situated closer to the windshield, and an outer panel-side folded part situated closer to the outer panel, and
an amount of expansion of the outer panel-side folded part is set larger than an amount of expansion of the windshield-side folded part.

6. An airbag device in which an airbag made of metal is disposed between an edge portion of a windshield and a front door of a vehicle, and which protects a pedestrian by deploying the airbag into the shape of a tube along the edge portion of the windshield by use of gas produced by an inflator, wherein
the airbag includes: a garnish part forming an outer surface of a vehicle body in cooperation with an outer panel; a folded part provided continuous to the garnish part, and folded; two closing parts for closing, respectively, opposite end portions of each of the garnish part and the folded part in a longitudinal direction; and vent holes formed in portions of the folded part that are adjacent to at least one of the two closing parts,
the folded part is folded in the shape of an accordion,
the vent holes are formed in flat parts of the folded part,
the vent holes, respectively, in two flat parts, which are opposed to each other in a folded state, of the folded part are formed to be alternately displaced,
the folded part includes a windshield-side folded part situated closer to the windshield, and an outer panel-side folded part situated closer to the outer panel, and
an amount of expansion of the outer panel-side folded part is set larger than an amount of expansion of the windshield-side folded part.

7. The airbag device according to claim 6, wherein
the garnish part includes an outer panel-side lip for sealing an interstice between the garnish part and the outer panel, and
the folded part includes a windshield-side lip for sealing an interstice between the folded part and the windshield.

8. The airbag device according to claim 6, wherein
a fold density of a portion closer to an inside of the vehicle body is lower than a fold density of a portion closer to an outside of the vehicle body.

9. The airbag device according to claim 6, wherein
a total of areas of openings of the vent holes is 700mm² with a margin of plus and minus 100mm².

10. The airbag device according to claim 6, wherein
the airbag made of metal is disposed between the edge portion and the outer panel projecting toward an outside of the vehicle body beyond the edge portion.

* * * * *